United States Patent [19]

Muendlein et al.

[11] Patent Number: 5,307,714
[45] Date of Patent: May 3, 1994

[54] DEVICE FOR HOLDING AND OPERATING A FACING HEAD

[75] Inventors: Werner Muendlein, Bietigheim-Bissingen; Gerhard Stolz, Ingersheim, both of Fed. Rep. of Germany

[73] Assignee: Komet Praezisionswerkzenge Robert Breuning GmbH, Besigheim, Fed. Rep. of Germany

[21] Appl. No.: 834,537

[22] PCT Filed: Aug. 16, 1990

[86] PCT No.: PCT/EP90/01344

§ 371 Date: Feb. 7, 1992

§ 102(e) Date: Feb. 7, 1992

[87] PCT Pub. No.: WO91/03340

PCT Pub. Date: Mar. 21, 1991

[30] Foreign Application Priority Data

Sep. 9, 1989 [DE] Fed. Rep. of Germany ....... 3930197

[51] Int. Cl.$^5$ .................................................. B23B 3/26
[52] U.S. Cl. ............................................ 82/123; 82/1.2
[58] Field of Search .................. 82/1.2, 123, 131, 137; 408/59; 409/136, 233; 483/31

[56] References Cited

U.S. PATENT DOCUMENTS

| | | |
|---|---|---|
| 3,422,705 | 1/1969 | Nahodil et al. ................. 82/1.2 |
| 3,824,883 | 7/1974 | Wloszek ........................ 82/1.2 |
| 4,224,846 | 9/1980 | Eysel et al. .................... 82/1.2 |
| 4,412,465 | 11/1983 | Wright ......................... 82/1.2 |
| 4,982,633 | 1/1991 | Jager ........................... 82/123 |
| 5,101,700 | 4/1992 | Muth ........................... 82/1.2 |
| 5,120,167 | 6/1992 | Simpson ........................ 82/1.2 |

FOREIGN PATENT DOCUMENTS

| | | | |
|---|---|---|---|
| 265026 | 4/1988 | European Pat. Off. | ............... 82/1.2 |
| 3532539 | 3/1987 | Fed. Rep. of Germany | ......... 82/1.2 |
| 3726276 | 2/1989 | Fed. Rep. of Germany | ......... 82/1.2 |

*Primary Examiner*—William E. Terrell
*Attorney, Agent, or Firm*—Flynn, Thiel, Boutell & Tanis

[57] ABSTRACT

The device of the invention has a supporting body detachably fixed to a machine spindle, a head element detachably fixed to the supporting body, and at least one slide which can be moved substantially at right angles to the axis of rotation of the head element and which carries a tool or tool carrier. The radial motion of the slide is produced by the action of an axially moving actuator rod and gear means. In addition, there is in the supporting body a coolant channel for hydraulic fluid. The inlet end of the channel is connected to an opening in the spindle and the outlet opens out in the head element. For the operation of the slide, the supporting body has two cylindrical bores disposed coaxial to the axis of rotation and a certain distance apart and in which two rigidly linked pistons are located which can be connected to the actuator rod. In the first of the two cylinder, one side of the piston is acted on by hydraulic fluid from the coolant channel, the other side of the piston being acted on by atmospheric air. A return spring acts against the force exerted by the hydraulic fluid on the piston assembly. The second cylinder is connected up on both sides of the piston to a closed hydraulic circuit which includes a non-return valve which opens in the return direction and closes in the direction of the slide motion, plus a flow-control valve for fluid-feed and fluid-return control.

23 Claims, 7 Drawing Sheets

DEVICE FOR HOLDING AND OPERATING A FACING HEAD

FIELD OF THE INVENTION

The invention relates to a device for holding and operating a facing head comprising a supporting body releasably fixable to a machine spindle, comprising a head element releasably fixable to the supporting body, comprising at least one slide movable essentially transversely with respect to the axis of rotation on the head element and carrying a tool or a tool carrier, comprising an adjusting mechanism having an axially movable actuator rod and a gear means converting the axial movement of the actuator rod into a transverse movement of the slide, and comprising a coolant channel arranged in the supporting body, connectable on an inlet side to a connecting opening to the spindle and terminating on the outlet side in the head element, and loadable with pressure fluid.

BACKGROUND OF THE INVENTION

Facing heads are primarily used for facing of workpiece surfaces to a high surface quality and for cutting during internal and external machining. In addition, there are facing heads as they are needed for example for the valve machining industry or spherical-turning heads for the axle or armature industry. Replacement attachment tools broaden the field of use of a facing head.

In a known device for holding and operating a facing head of the above-disclosed type (DE-C 2 608 930), the adjusting mechanism includes an actuator rod arranged coaxially movably with respect to the axis of rotation of the supporting body on helical tooth systems arranged on two diametrically opposite sides, the teeth which cross, however, in relationship to the direction of movement of the actuator rod have the same angle. Each of two serrated slats arranged symmetrically with respect to the actuator rod are provided on the slide and on a counterweight of the slide, which serrated slats mate with the helical tooth system on the actuator rod. The teeth on the serrated slats of the slide extend thereby in opposite direction of the ones of the serrated slats on the counterweight. In the place of the counterweight, it is also possible to provide a second slide movable in an opposite direction to the first slide. A cross-feed mechanism extending centrally through the machine spindle is needed to operate the actuator rod. The cross-feed mechanism has been constructed especially for this purpose and can be operated from the side of the tool. On the other hand, the center area of the machine spindle is occupied with a feed device for the tool in machining centers with an automatic tool replacement capability so that an additional cross-feed mechanism cannot easily be stored there. On the other hand, it would be of a great advantage, in the interest of a complete machining of workpieces in one setting, when facing heads could also be inserted into machining centers.

It is hereby conducive to use the fluid coolant existing in each machining center and circulated with a high pressure of at least 15 bar as a drive means for the cross slide.

Based on this, the basic purpose of the invention is to provide a device for holding and operating a facing head of the above-disclosed type, with which, using the coolant in particular also existing in machining centers and circulating it under pressure, a slide adjustment is assured which is reliable, also at high speeds, and suitable for continuous operation.

To attain this purpose the following combination of characteristics is suggested according to the invention:

- The supporting body has two spaced chambers arranged coaxially with respect to the axis of rotation, in which chambers are arranged two pistons rigidly coupled with one another and to the actuator rod;
- the first of the two chambers is loadable on the one piston side with pressure fluid from the coolant channel and on the other piston side with atmospheric air;
- a return spring acting against the force of the pressure fluid onto the piston arrangement is provided;
- the second chamber is connected on both sides of the piston to a closed hydraulic circuit which contains a check valve closing in machining direction of the slide movement and opening in return direction, and a flow-control valve.

The division into two separate hydraulic circulating systems makes it possible that in the open coolant circulating system also more or less contaminated coolant both for the cross-slide drive and also for the cooling and chip removal in the machining area can be utilized, and that the control of the feed and return speed, for which control is important, uncontaminated fluid be used, can be carried out in a closed hydraulic circuit. Since the centrifugal forces, depending on the speed of the facing head in the slide area, must be overcome by the operating device, the slide feed must be adjusted by adaptation to the respective machining tasks from case to case through the flow-control valve in the closed hydraulic circuit. The flow-control valve contains for this purpose advantageously an externally adjustable adjusting throttle for adjusting the volume flow within the closed hydraulic circuit. It must thereby be considered that significant pressure variations can result in the hydraulic circuit, for example for the following reasons:

- Center of gravity shift of the moved masses in various stroke positions of the slide;
- variable speeds and thus variable centrifugal forces acting on the slide;
- variable load during the machining operation based on different clamping cross sections;
- pressure variations in the coolant system.

In order to maintain the feed speed constant independently from pressure variations, the flow-control valve contains, according to a preferred embodiment of the invention, in addition a piston manometer with which the volume flow adjusted on the adjusting throttle can be very exactly controlled. The piston manometer has advantageously an operating piston controlling the cross section of an outflow opening of the flow-control valve, loaded with the difference pressure occurring at the adjusting throttle and a compression spring acting in opening direction of the outflow opening.

The spring acting onto the piston arrangement and the check valve in the closed hydraulic circuit permit, if necessary supported by the centrifugal force acting on the slide, an automatic quick return of the slide into its initial position.

In order to avoid a loss of fluid from the coolant channel of the supporting body during a tool exchange, an initially biassed check valve is arranged on the inlet side of the coolant channel. To moreover enable a transfer of coolant to the machining area of the facing head and to simultaneously avoid a fluid escape during the exchange of the head element, a check valve is arranged on the outlet side of the coolant channel in the supporting body, which check valve prevents a pressureless fluid discharge and contains an overflow throttle.

A leakage of hydraulic fluid from the closed hydraulic circuit is unavoidable during long periods of operation. The lost hydraulic fluid is slowly replaced with an air bubble without special measures, which because of the compressibility of air can cause initial control delays and when continuing can result in machining inexactnesses and breakdowns in operation. To avoid this, a preferred embodiment of the invention provides that the lost hydraulic fluid is constantly automatically replenished. A fluid reservoir is arranged in the supporting body for this purpose, through which reservoir hydraulic fluid is automatically added to the hydraulic circuit. The fluid reservoir is advantageously designed as a piston cylinder connected to the hydraulic circuit through a check valve and the piston of which acts under initial biassing against the fluid contained in the cylinder. The piston rests advantageously under the action of a spring against the fluid column. Furthermore, the piston can be arranged such that it acts, with the spindle rotating, under the action of the centrifugal force, onto the fluid column. The latter is the case when the piston rests radially outwardly against the fluid column, in particular when it is arranged radially within the fluid column in the fluid reservoir.

A fill-level control in the fluid reservoir and thus in the closed hydraulic circuit is realized according to the invention by rigidly connecting a pin to the piston, which pin upon a fluid reduction is moved radially outwardly in a pin hole. The pin hole can be arranged essentially radially in a locking lid of the fluid reservoir. When the control pin in the pin hole reaches the outer contour of the housing, then this is proof that fluid must be added. The fluid reservoir can for this purpose be filled from outside with hydraulic fluid through a closeable fill opening.

According to a further advantageous embodiment of the invention, the diameter of the first chamber is larger than the one of the chamber cylinder. The supporting body has advantageously a stepped bore concentric with respect to the axis of rotation, which bore is divided into two chambers by an intermediate lid connected to the bore step and having a fluid-tight, sealed piston-rod through opening therein. When the supporting body has a steep-angle taper shaft, then at least the second chamber and the return spring are arranged within the steep-angle taper shaft. The tool shaft can thereby have an annular recess opening toward the second chamber concentric with respect to the axis of rotation to receive the return spring in the form of a compression spring.

The piston in the second chamber has advantageously a further piston rod extending toward the spindle on a side remote from the first chamber, which piston rod sealingly, slidingly extends into a fluid chamber connectable to the connecting opening for the pressure fluid, which connecting opening is on the side of the spindle, so that the coolant channel leading to the first chamber and the head element can be extended axially through the piston rod and the further piston rod. In order to obtain a type of construction of the supporting body which is compact in axial direction, the supporting body has a bore concentric with respect to the axis of rotation with a cup-shaped piston therein which is open on one side to form the second chamber, and defining with a bottom wall thereof the first chamber within the bore, which wall has a piston-rod through opening therethrough. The bottom wall of the cup-shaped piston has advantageously an annular recess opening toward the first chamber to receive an annular shoulder axially projecting from the first piston and having at least one peripheral groove to receive a guide and/or seal ring therein.

BRIEF DESCRIPTION OF THE DRAWINGS

The invention will be discussed in greater detail hereinafter in connection with the exemplary embodiments schematically illustrated in the drawings, in which.

DETAILED DESCRIPTION

Figure 1:
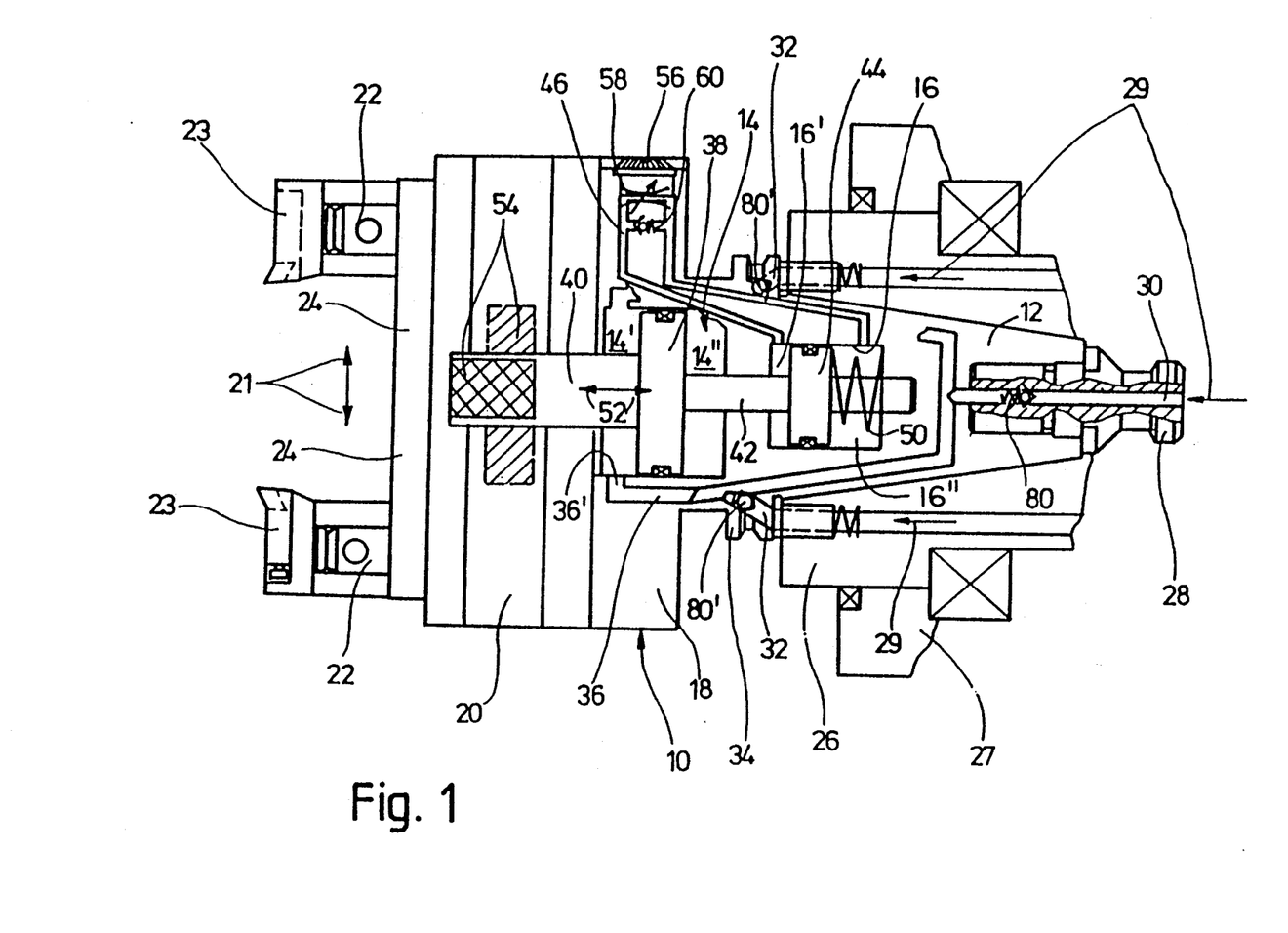
FIG. 1 is a diagrammatic view of a coolant-operated facing head.

As can in particular be seen in FIG. 1, the facing head consists essentially of a supporting body 10 having a tool shaft 12 and a holding flange 18 projecting radially outwardly from the tool shaft, a head element 20 releasably fastenable to the holding flange 18, and two slides 24 movable radially in direction of the arrows 21 in opposite directions on the head element 20, and each slide carrying a tool carrier 22 having thereon an attachment tool 23.

The tool shaft 12 of the supporting body, which is designed as a steep-angle taper in the illustrated exemplary embodiment, can be clamped in a correspondingly conically designed tool-receiving means on a spindle 26 of a machine tool 27 coupled to the feed bolt 28 by means of a feeding mechanism which is on the machine tool and is not illustrated. The machine tool has furthermore a coolant-circulating system primarily used for cooling the tool 23 and for facilitating a chip removal at the machining place. The coolant supply 29 into the facing head occurs either centrally through an inlet opening 30 in the area of the feed bolt 28 or off-center through inlet openings 32 in the area of the gripping flange 34 on the supporting body 10. The inlet openings 30 or 32 terminate in a coolant channel 36 which extends through an overflow throttle valve 84, shown in FIG. 2, into the head element 20 and thence through the slide 24 to an outlet orifice in the area of the tools 23.

The coolant channel 36 furthermore terminates at a connection 36' to a piston chamber 14 arranged within the supporting body 10, a piston 38 in the piston chamber being connected on one side thereof to a pull rod 40 of an adjusting mechanism for the slide 24 and on the other side thereof to a piston rod 42 connected to a piston 44 in a chamber 16 connected at opposite ends to a closed hydraulic circuit 46. In the chamber 14, only the cylinder chamber or first cavity 14' on the pull rod side of piston 38 is loaded with coolant 29, while the cylinder chamber or second cavity 14" is connected to the outside atmosphere through a filter 48 in the form of a porous sintered member. On the side of the piston arrangement 38, 44, remote from the coolant connection 36', there is a return spring 50 in the cylinder chamber or fourth cavity 16'' of the chamber 16, which return spring, with the coolant connection 36' being without pressure, urges the piston arrangement 38, 44 and, thence, the coolant in the cylinder chamber 14' into the coolant channel 36. Chamber 16 and piston 44 cooperate to define a cylinder chamber or third cavity 16'.

The inlet opening 30 arranged in the feed bolt 28 terminates, in the exemplary embodiment illustrated in FIGS. 2 to 5, in a check valve 80 arranged coaxially in a fluid chamber 110, into which fluid chamber extends a further piston rod 42' axially projecting beyond the piston 44 on the side of the spindle. The coolant channel 36 extends axially through the piston rod 42, 42' to the chamber 14'. The diameter of the piston rods 42 and 42' is the same so that the piston 44 has the same piston surface area on both sides.

Axial movement (arrows 52) of the piston arrangement 38, 44 is converted by the pull rod 40 and a gear means 54 into a radial movement (arrows 21) for the two slides 24, which radial movement is oppositely directed. The location of the center of gravity of the slides 24 is chosen such, in the exemplary embodiment illustrated in FIG. 1, that the slides, when the cylinder chamber 14' is loaded with pressure fluid from the coolant channel 36, are moved radially from outside to the inside against the centrifugal force acting onto the slides, whereas with a pressureless coolant connection 36', the return movement, caused by the spring 50, is significantly enhanced by the centrifugal force acting onto the slide 24.

The feed speed of the slide 24 and thus of the tools 23 can be adjusted depending on the respective machining task, the spindle speed and the coolant pressure made available through the machine tool 27 through a two-way flow-control valve 58 in the closed hydraulic circuit 46. The flow-control valve 58 has an adjusting throttle 58' externally adjustable by a knurled-head screw 56.

Figure 7:
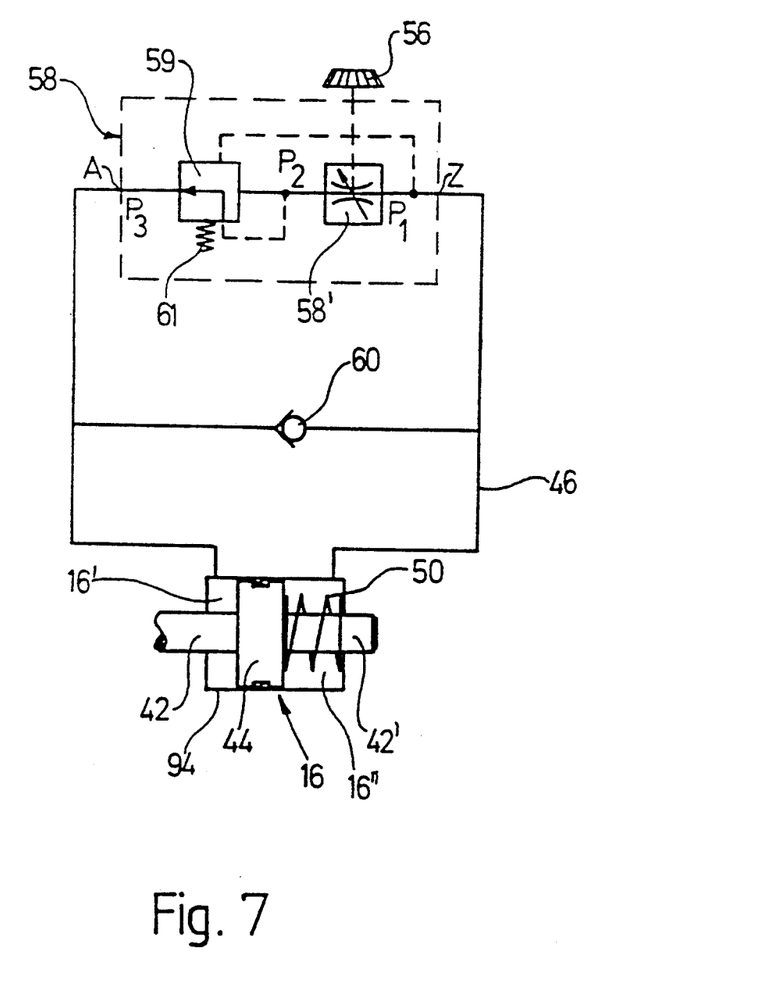
FIG. 7 is a diagrammatic view of the flow-control valve with a piston manometer.

The flow-control valve 58 (FIG. 7) additionally contains a piston manometer 59 controlling the cross section of the discharge opening A. The operating piston of the piston manometer can be loaded with the difference pressure $P_1 - P_2$ and the force of a compression spring 61. $P_1$ is thereby the inlet pressure Z in front of the throttle valve 58' and $P_2$ is the pressure after the throttle valve 58'. Simple thinking shows that the volume flow adjusted at the throttle valve 58' is maintained even when pressure variations occur at the inlet Z and/or at the outlet A (pressure $P_3$) of the two-way flow-control valve.

A check valve 60 connected in parallel with the flow-control valve 58 assures that, after the operation is finished and the coolant supply is interrupted, a quick return of the tools 23 into their initial positions is possible. The flow-control valve 58 and the check valve 60 are externally inserted as combined structural parts into the hydraulic circuit 46 (FIGS. 2 and 3) in the area of the flange 18.

Figure 2:
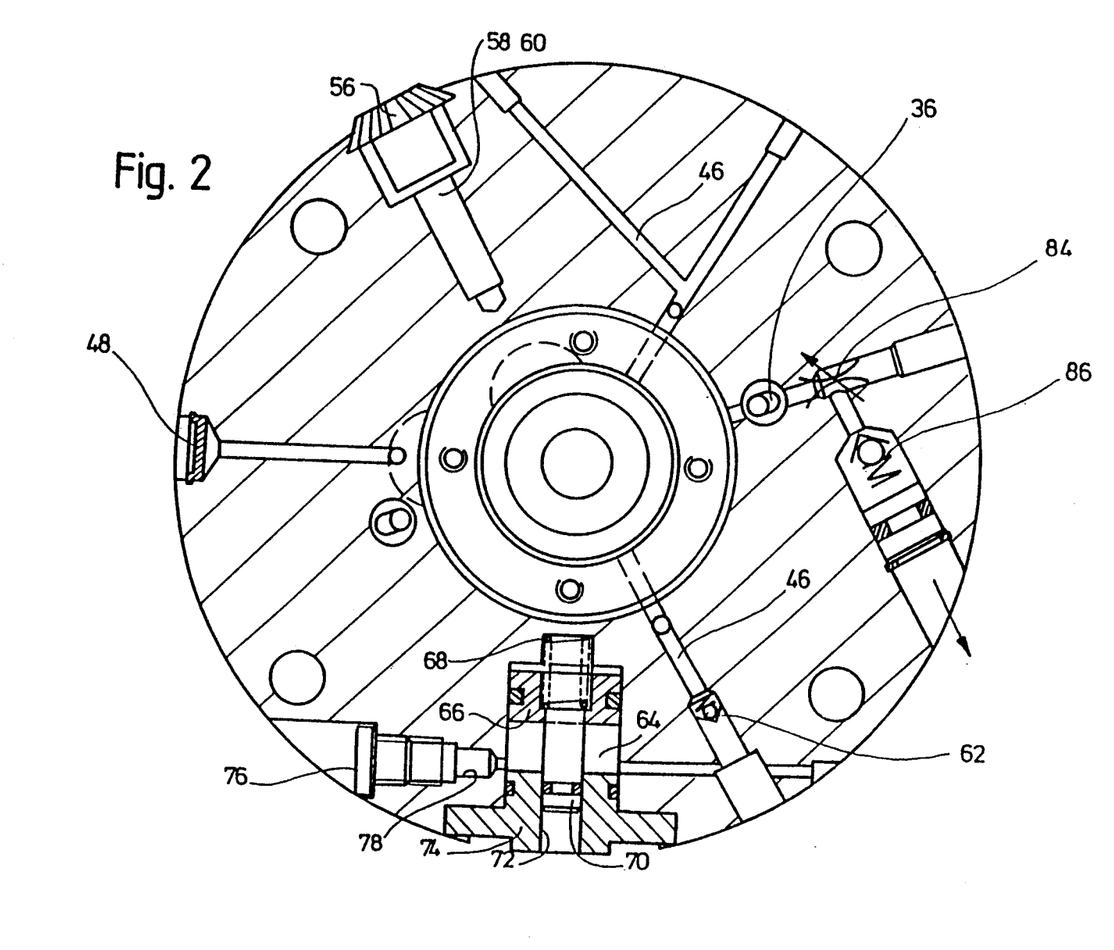
FIG. 2 is a cross-sectional view of the flange area of a supporting body for a facing head, which supporting body has an operating device.

As can particularly be seen in FIG. 2, the closed hydraulic circuit 46 is constantly being loaded through a check valve 62 with hydraulic fluid from a reservoir 64 at an inlet pressure applied by a piston 66 onto a fluid column 64. The piston 66 is for this purpose, on the one hand, pressed against the fluid column by the action of a compression spring 68. On the other hand, the piston 66 arranged within the fluid column 64 is, with the tool rotating, pressed outwardly against the fluid column under the action of the centrifugal force. With this arrangement of the fluid reservoir, it is guaranteed that the hydraulic fluid, which during operation is unavoidably displaced from the closed hydraulic circuit, is automatically supplemented without forming an air pocket, which air pocket would interfere with the safety of the operation. The described arrangement furthermore permits a relatively simple fill-level control by utilizing a pin 70 arranged on the piston 66, which pin 70 is slidingly sealed against fluid loss in an outwardly open pin hole 72 of a lid 74 inserted radially into the flange 18 of the supporting body 10. When the pin 70 reaches the outer contour of the housing, then hydraulic fluid must be added. A fill opening 78 ending in the reservoir and closable by a locking screw 76 is provided for the air-free adding of hydraulic fluid.

In order to be able to replace the supporting body on the spindle without any loss of fluid, a check valve 80 exists in each area of the inlet openings 30 or 32. The adjustable overflow throttle 84 and a check valve 86, through which coolant can reach the operating area at a reduced pressure, is provided on the outlet side of the coolant channel 36, which outlet side leads to the head element 20.

Figure 3:
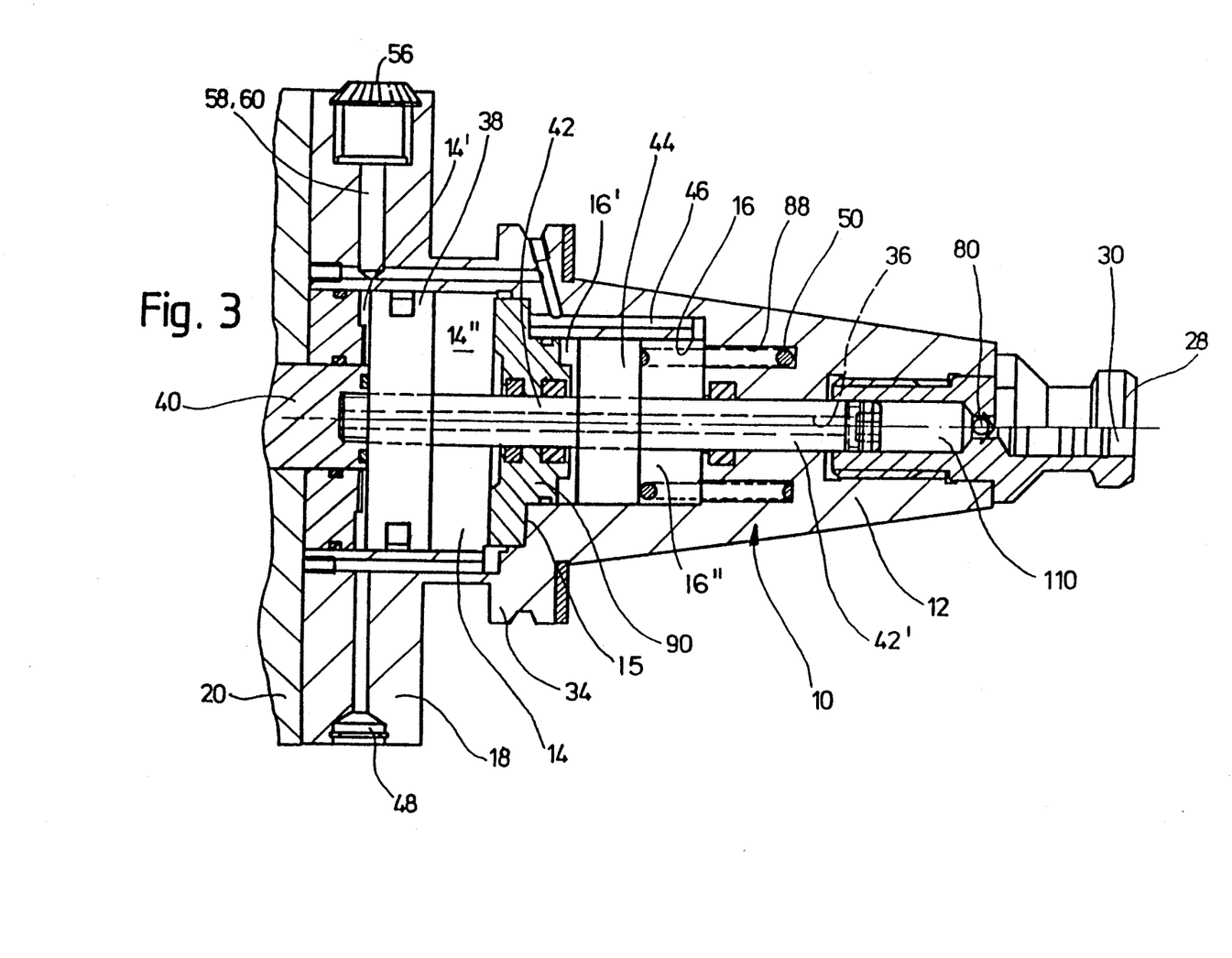
FIGS. 3 to 5 are various longitudinal cross-sectional views of the supporting body according to FIG. 2.
Figure 4:
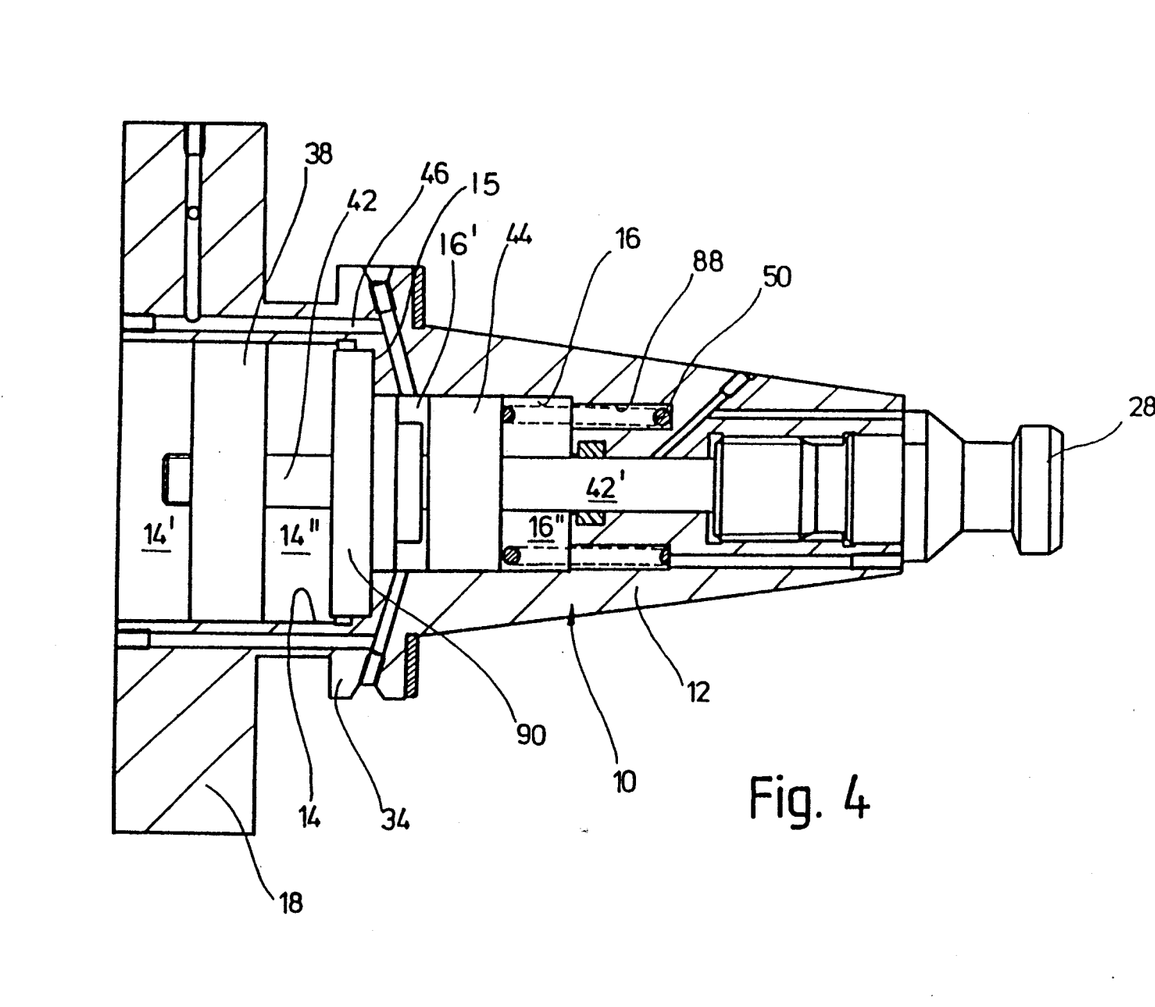
Figure 5:
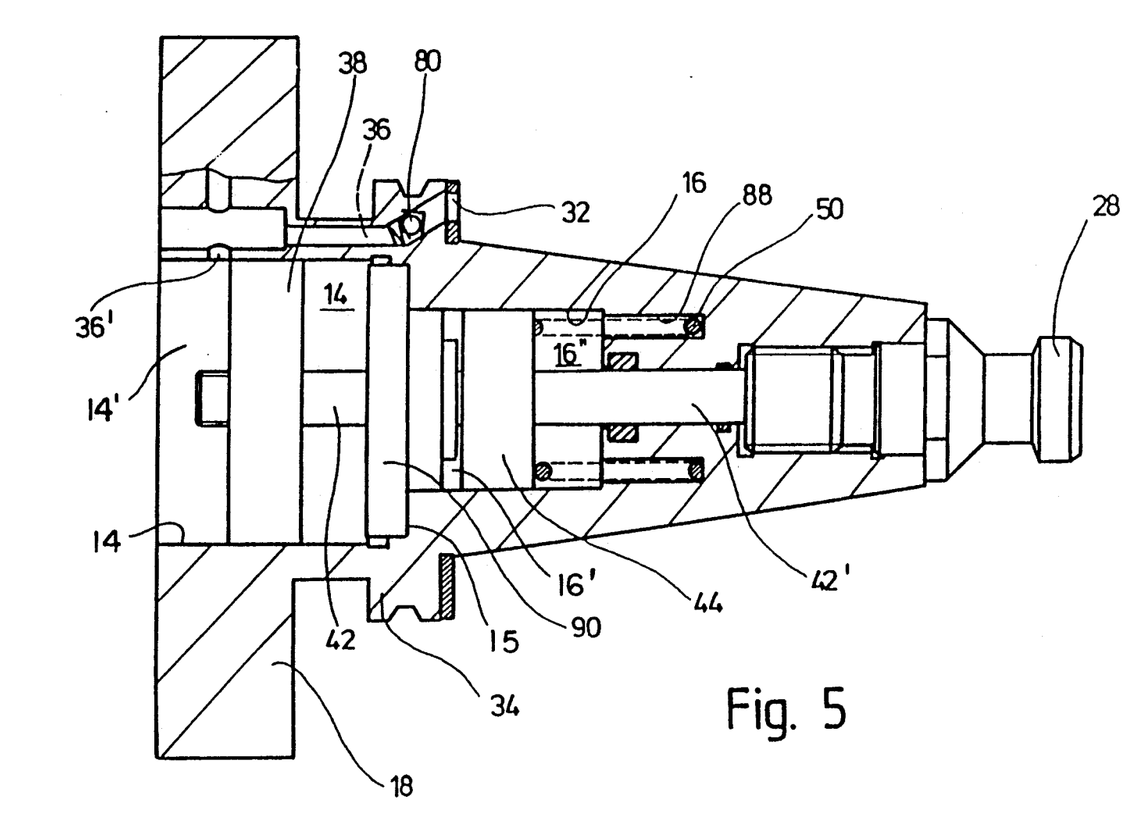

FIGS. 3 to 5 show that the return spring 50 in the illustrated exemplary embodiment is designed as a compression spring received at its one end in an annular recess 88 connected to the cylinder chamber 16''. The chambers 14 and 16 are designed as a stepped bore in the supporting body. An intermediate lid 90 serves to separate the chambers from one another and is connected to the step shoulder 15 of the step bore. The piston rod 42 is slidingly sealed against fluid loss through the intermediate lid 90.

Figure 6:
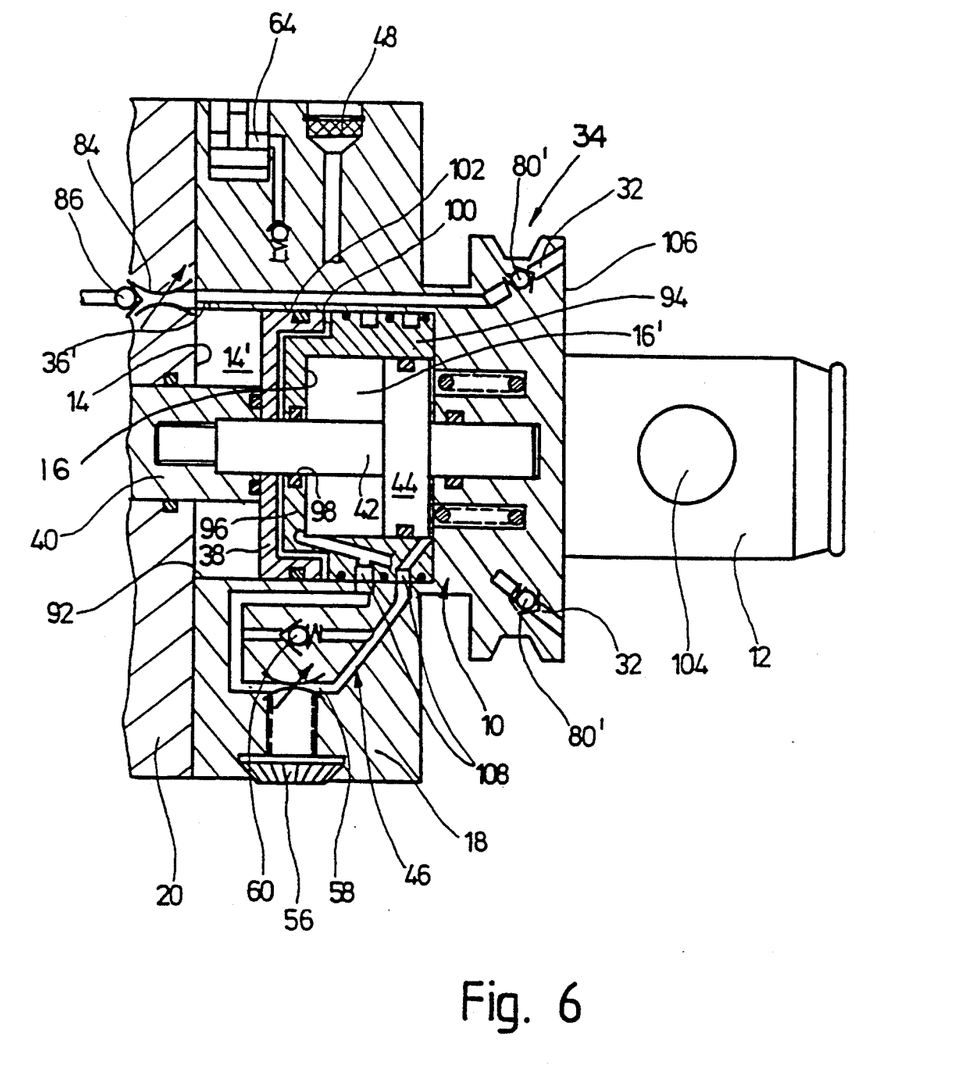
FIG. 6 is a longitudinal cross-sectional view of a supporting body, modified compared with FIGS. 2 to 5, including the operating device.

The exemplary embodiment of a supporting body 10, illustrated in a longitudinal cross-sectional view in FIG. 6, includes an axial bore 92 open toward the head element 20, into which bore is inserted a cup-shaped piston 94 open at one end to form the second chamber 16. The cup-shaped piston 94 simultaneously defines with its bottom wall 96 within the bore 92 the first chamber 14 and has a fluid-tight, sealed through opening 98 for the piston rod 42 connecting the two pistons 38, 44 with one another. The cup-shaped piston 94 has furthermore adjacent its bottom wall an outwardly opening, annular recess 100 open toward the first chamber for receiving an annular shoulder 102 axially projecting on the first piston 38 into its peripheral area. The annular shoulder 102 is provided with peripheral grooves for a guide ring and a seal ring enlarges the outer surface of the thin-wall piston 38, which outer surface is slidingly guided in the chamber 14, and guarantees in this manner a compact construction of the chamber arrangement 14, 14'. The piston rod 42 projects from both sides, and with the same cross section, of the piston 44 so that the piston surface area is the same on both sides.

The tool shaft is, in the exemplary embodiment illustrated in FIG. 6, designed as a cylindrical fitting pin 12 having an integrated clamping mechanism. The inlet opening 32 for the coolant and the check valve 80' are in the area of the planar surfaces 106 of the gripping flange 34 facing the fitting pin 12 and are connected to the coolant channels 36 arranged radially off-set on the supporting body 10. The coolant channel 36 terminates at the connection 36' in the cylinder chamber 14' and the overflow throttle 84 and check valve 86 in the head element 20.

The hydraulic channels arranged in the cup-shaped piston wall 94 and connected to the cylinder chambers 16' and 16" are connected, while forming the closed hydraulic circuit 46, through axially sealed-off peripheral grooves 108 to the channels in the flange area 18, which channels lead to the adjusting throttle 58, the check valve 60 and the fluid reservoir 64.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In a device for holding and operating a facing head including a supporting body releasably fixable to a machine spindle, a head element releasably fixable to the supporting body, at least one slide moveable in a machining direction and a return direction essentially transversely with respect to an axis of rotation of the head element and supporting a tool or a tool carrier thereon, an adjusting mechanism having an axially movable actuator rod and a gear means for converting an axial movement of the actuator rod into a transverse movement of the slide, and a coolant channel arranged in the supporting body and connected on an inlet side to a connecting opening of the machine spindle and terminated on an outlet side in the head element and having a pressure fluid contained therein, wherein the improvement comprises:

first and second chambers axially spaced from one another and coaxial with respect to the axis of rotation;

first and second pistons disposed within respective ones of said first and second chambers, said pistons being rigidly coupled together by a piston rod extending therebetween and being coupled to the actuator rod;

said first piston dividing said first chamber into first and second axially spaced cavities disposed on opposite sides of said first piston, said first cavity being remote from said second chamber and communicating with the outlet side of the coolant channel to receive the pressure fluid therefrom, the second cavity communicating with atmospheric air;

said second piston dividing said second chamber into third and fourth axially spaced cavities disposed on opposite sides of said second piston, said fourth cavity being remote from said first chamber and having a return spring axially disposed therein, said return spring acting against the force of the pressure fluid in said first cavity; and a closed hydraulic circuit having first and second paths communicating with said third and fourth cavities, respectively, said hydraulic circuit including a check valve which is closed during movement of the slide in the machining direction and open in the return direction of the slide, and a flow-control valve connected in parallel with said check valve.

2. The device according to claim 1, wherein a second check valve is arranged on the inlet side of the coolant channel to prevent the pressure fluid from exiting from the supporting body.

3. The device according to claim 1, wherein an overflow throttle and a second check valve are arranged on the outlet side of the coolant channel to prevent the pressure fluid from exiting from the head element.

4. The device according to claim 1, wherein said second cavity is communicated with the atmospheric air through a porous sintered disk filtering element.

5. The device according to claim 1, wherein a fluid reservoir is arranged in the supporting body to automatically refill the closed hydraulic circuit with a hydraulic fluid.

6. The device according to claim 5, wherein said fluid reservoir is connected to the closed hydraulic circuit through a second check valve and said fluid reservoir includes a piston disposed therein which applies an inlet pressure against the hydraulic fluid which forms a fluid column in the fluid reservoir.

7. The device according to claim 6, wherein the piston is urged against the fluid column under the action of a spring.

8. The device according to claim 6, wherein the piston, with the facing head rotating, is urged against the fluid column under the action of a centrifugal force.

9. The device according to claim 6, wherein the piston includes a radially outwardly extending control pin indicating a fill level in the fluid reservoir by its position in a pin hole.

10. The device according to claim 9, wherein the pin hole extends essentially radially through a locking lid of the fluid reservoir, and that the pin hole has the same length or is shorter than the control pin.

11. The device according to claim 1, wherein the diameter of the first chamber is larger than the diameter of the second chamber.

12. The device according to claim 1, wherein the supporting member has a tool shaft designed as either a steep-angle taper or as a cylinder, and that at least one of the first and second chambers and the return spring are arranged at least partially within the tool shaft.

13. The device according to claim 1, wherein the supporting body contains an annular recess which opens toward the second chamber and is concentric with respect to the axis of rotation for receiving therein the return spring in the form of a compression spring.

14. The device according to claim 1, wherein the supporting body includes a step bore disposed therein and being concentric with respect to the axis of rotation, said step bore being divided into said first and second chambers by an intermediate lid connected to a step shoulder of said step bore and having said piston-rod extending through an opening therein, said piston-rod being slidingly sealed against fluid loss through said intermediate lid.

15. The device according to claim 1, wherein the supporting body includes a bore disposed therein and being concentric with respect to the axis of rotation, said bore having a cup-shaped piston disposed therein, said cup-shaped piston being open on one side to form the second chamber within the bore and having a bottom wall defining the first chamber within the bore (92), the bottom wall having said piston-rod extending through an opening therein, said piston-rod being slidingly sealed against fluid loss through said intermediate lid.

16. The device according to claim 15, wherein the bottom wall of the cup-shaped piston has an annular recess which opens toward the first chamber to receive an annular shoulder axially projecting from the first piston, said annular shoulder having at least one peripheral groove to receive a guide and/or seal ring therein.

17. The device according to claim 1, wherein said first-mentioned piston rod extends from said second piston into said third cavity, and a second piston rod extends from said second piston into said fourth cavity, said first-mentioned and second piston rods having the same diameter.

18. The device according to claim 1, wherein said second piston has a piston surface area of equal size on opposite sides thereof.

19. The device according to claim 1, wherein said second piston includes a second piston rod extending from said second piston into said fourth cavity toward the spindle, said second piston rod being sealingly, slidingly received in a fluid chamber connectable to the connecting opening for the pressure fluid, which connecting opening is on the side of the spindle, and that the coolant channel leading to the first chamber and to the head element extends axially through the second piston rod.

20. The device according to claim 1, wherein the flow-control valve includes an adjusting throttle.

21. The device according to claim 20, wherein the flow-control valve includes a piston manometer associated with the adjusting throttle.

22. The device according to claim 21, wherein the piston manometer includes an operating piston controlling a flow cross section of a discharge opening and loaded with a difference pressure occurring at the adjusting throttle, and a pressure spring acting in an opening direction of the discharge opening.

23. The device according to claim 1, wherein the flow-control valve and the check valve form an exchangeable structural unit.

* * * * *

UNITED STATES PATENT AND TRADEMARK OFFICE
CERTIFICATE OF CORRECTION

PATENT NO. : 5,307,714

DATED : May 3, 1994

INVENTOR(S) : Werner Muendlein

It is certified that error appears in the above-indentified patent and that said Letters Patent is hereby corrected as shown below:

Title page, item [73], Assignee: should be --Komet Praezisionswerkzeuge Robert Breuning GmbH,--.

Signed and Sealed this

First Day of November, 1994

*Attest:*

BRUCE LEHMAN

*Attesting Officer*  *Commissioner of Patents and Trademarks*